(12) United States Patent
Morishita et al.

(10) Patent No.: US 6,571,816 B2
(45) Date of Patent: Jun. 3, 2003

(54) CELL SAFETY VALVE AND METHOD FOR MANUFACTURING THE SAME

(75) Inventors: Takuma Morishita, Sumoto (JP); Hironori Marubayashi, Sumoto (JP); Shigeki Fujii, Hyogo (JP); Yosihiro Tobita, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 66 days.

(21) Appl. No.: 09/799,686

(22) Filed: Mar. 7, 2001

(65) Prior Publication Data

US 2001/0027807 A1 Oct. 11, 2001

(30) Foreign Application Priority Data

Mar. 9, 2000 (JP) .......................................... 2000-065492

(51) Int. Cl.$^7$ ........................... F16K 17/16; H01M 2/12
(52) U.S. Cl. ................. 137/68.27; 137/68.25; 220/89.2; 429/56
(58) Field of Search ............... 137/68.23, 68.26, 137/68.27, 68.25; 220/89.2; 429/53, 56

(56) References Cited

U.S. PATENT DOCUMENTS

| | | | | |
|---|---|---|---|---|
| 4,669,626 A | * | 6/1987 | Mozley | 137/68.26 |
| 5,267,666 A | * | 12/1993 | Hinrichs et al. | 137/68.21 |
| 5,411,158 A | * | 5/1995 | Kays et al. | 137/68.27 |
| 5,609,972 A | | 3/1997 | Kaschmitter et al. | 429/56 |
| 5,631,634 A | * | 5/1997 | Strelow | 137/68.11 |
| 5,741,606 A | | 4/1998 | Mayer et al. | 429/53 |
| 6,006,938 A | * | 12/1999 | Mozley et al. | 137/68.19 |
| 6,265,097 B1 | * | 7/2001 | Konno et al. | 137/68.19 |

FOREIGN PATENT DOCUMENTS

| | | |
|---|---|---|
| FR | 2579833 | 10/1986 |
| JP | 63-126152 | 5/1988 |
| JP | 01-319249 | 12/1989 |
| JP | 10-106524 | 4/1998 |
| JP | 11-250885 | 9/1999 |
| JP | 11-273640 | 10/1999 |

OTHER PUBLICATIONS

European Search Report dated Jul. 26, 2001.

* cited by examiner

Primary Examiner—Michael Powell Buiz
Assistant Examiner—Ramesh Krishnamurthy
(74) Attorney, Agent, or Firm—Armstrong, Westerman & Hattori, LLP

(57) ABSTRACT

A cell safety valve which has a thin valve plate formed on a sheet-shaped sealing plate for sealing the cell such that if the inner pressure of the cell exceeds a predetermined value, the valve plate breaks to release a gas in the cell to the outside, in which the valve plate has a dome-shaped dome portion formed thereon and, at its middle or near it, a break groove formed for facilitating the breaking of the valve.

By this construction, it is possible to prevent the electrolyte from leaking while reducing the cell-to-cell difference in the operating pressure of the safety valve and ensuring a sufficient open area at the time of the operations of the safety valve.

16 Claims, 13 Drawing Sheets

CELL SAFETY VALVE AND METHOD FOR MANUFACTURING THE SAME

BACKGROUND OF THE INVENTION (1) Field of the Invention

The present invention relates to a cell safety valve in which a thin valve plate is formed in an opening hole in a sealing plate for sealing a cell such that if an internal cell pressure exceeds a predetermined value this valve plate may break so as to release a gas in the cell out of the cell, and a method for manufacturing the same.

(2) Description of the Related Art

Recently, besides $LiCoO_2$ and other lithium-containing composite oxides used as the positive electrode material, non-aqueous electrolyte cells using as the negative electrode material, such materials as lithium-aluminum alloy and carbon materials, which are capable of intercalating and deintercalating lithium ions, are attracting public attention as being capable of improving capacity.

When such a non-aqueous electrolyte cell is mishandled, e.g., put in fire, recharged, or discharged under abnormal conditions, a great amount of gas may be produced in the cell. Unless the gas in the cell is released out quickly, it may burst or ignite problematically. To prevent such a problem, such a cell is provided with a safety valve for releasing the gas in the cell out of it quickly at the time of abnormality. As such a safety valve, the following valves have been proposed:

(1) a valve that, as described in Japanese Unexamined Patent Application No. 11-250885 (see FIGS. 1 through 4), in an opening hole 21*a* in a ring-shaped base material 21, a cladding material 22 (with a thickness of about 10% of that of the base material) formed by two sheets of aluminum-based materials and constituting a valve plate is welded or pressure-welded to form a safety valve 23, which is in turn mounted to a sealing plate 24 (one that is a so-called cladding-material-spec safety valve);

(2) a valve that, as described in Japanese Unexamined Patent Application No. 11-250885 (see FIGS. 5 and 6), a break groove 26 is formed at around the middle of an opening hole 25*a* in a sealing plate 25; and (3) a valve that, as described in Japanese Unexamined Patent Application No. 11-273640 (see FIGS. 7 and 8), a dome-shaped thin valve plate 29 is formed starting from the lower end of an opening hole 28*a* in a sealing plate 28.

Those conventional safety valves, however, have had the following problems.

Problems of Type (1) Safety Valve

This safety valve 23 may have irregularities in strength of welding or pressure welding of the base material 21 and the cladding material 22, which may in turn damage the cladding material 22 when the safety valve 23 is mounted to the sealing plate 24, thus causing leakage of an electrolyte or increasing the cell-to-cell difference in the operating pressure of the safety valve.

Problems of Type (2) Safety Valve

This safety valve, although it reduces the cell-to-cell difference in the safety-valve's operating pressure, may have irregularities in the open area of a valve plate 27 upon the breaking of the safety valve, so that in case the open area is small, amount of gas production may be more than the amount of gas release. This may prevent the safety valve from having its own functions sufficiently, thus causing the cell to ignite or burst problematically.

Problems of Type (3) Safety Valve

This safety valve, although it can release a lot of gas produced quickly due to an enlarged open area of the valve plate 29, has the thin valve plate 29 formed from the lower end of the opening hole 28*a*, so that the valve plate 29 may be damaged by a jig etc. to produce cracks etc. if it had vibration or shock on it during assembly of the cells, thus causing the leakage of the electrolyte.

SUMMARY OF THE INVENTION

It is an object of the present invention to provide such a cell safety valve and a method for manufacturing the same that can ensure a sufficient open area during the operation of the safety valve while reducing the cell-to-cell difference in the operating pressure of the safety valve.

It is another object of the present invention to provide such a safety valve and a method for manufacturing the same that can prevent an electrolyte from leaking.

To achieve the above-mentioned objects, a cell safety valve according to a first aspect of the invention has its thin valve plate formed on a sheet-shaped sealing plate for sealing the cells such that if the internal cell pressure exceeds a predetermined value, the valve plate may break to release the gas in the cell to the outside, wherein the valve plate has a dome-shaped dome portion formed thereon and also at its middle or near it has a break groove for facilitating the breakage thereof.

Since thus the valve plate has the break groove at its middle or near it for facilitating the breakage thereof, if the internal cell pressure rises abnormally, the valve plate breaks surely starting from the break groove; in addition, as the valve plate has the dome-shaped dome portion formed thereon, after the valve plate has thus started breaking starting from the break groove, the peripheries of the dome portion also break by increased stress due to the gas. Therefore, even with some irregularities in the thickness of the valve plate, the cell-to-cell difference can be reduced in the operating pressure of the safety valve.

A second aspect of the invention is characterized in that the cell safety valve according to the first aspect of the invention, wherein the above-mentioned dome portion is provided one.

A third aspect of the invention is characterized in that the cell safety valve according to the second aspect of the invention, wherein the above-mentioned break groove is formed in the periphery of the above-mentioned dome portion.

The break groove is thus formed in the periphery of the dome portion, to further facilitate the breaking of the valve plate, thus reducing the cell-to-cell difference in the operating pressure of the safety valve.

A forth aspect of the invention is characterized in that the safety valve according to the first aspect of the invention, wherein the above-mentioned dome portion is provided two or more.

The dome portion is thus provided two or more, to ensure a sufficient open area during the operation of the safety valve.

A fifth aspect of the invention is characterized in that the safety valve according to the forth aspect of the invention, wherein the above-mentioned break groove is formed in the periphery of at least one of the above-mentioned two dome portions or more.

Such a configuration gives almost the same actions and effects as those of the third aspect of the invention.

A sixth aspect of the invention is characterized in that the safety valve according to the first aspect of the invention, wherein the above-mentioned valve plate as a whole is disposed between an imaginary plane flush with the outside surface of the above-mentioned sealing plate and an imaginary plane flush with the inside surface of the above-mentioned sealing plate.

In such a configuration, the valve plate does not come in direct contact with the jig etc., so that even in case of a vibration or shock during the assembly of the cells, it does not cause the jig etc. to damage the valve plate, thus inhibiting the electrolyte from leaking.

A seventh aspect of the invention is characterized in that the safety valve according to the first aspect of the invention, wherein the above-mentioned dome portion bulges in a direction toward the outside of the cell so as to form a dome shape.

Such a configuration further ensures the operations of the safety valve.

An eighth aspect of the invention is characterized in that the safety valve according to the first aspect of the invention, wherein the thickness of the above-mentioned valve plate is regulated to 0.1 through 10% of that of the above-mentioned sealing plate.

The thickness of the valve plate is thus regulated because a valve plate thickness of less than 0.1% of the sealing plate thickness is so thin that may cause leakage of the electrolyte, while a valve plate thickness of more than 10% of the sealing plate is so thick that excessively increase the cell-to-cell difference in the operating pressure of the safety valve.

A ninth aspect of the invention is characterized in that the safety valve according to the first aspect of the invention, wherein the plane shape of the above-mentioned valve plate is a true circle, an ellipse, or a quadrangle.

Among a true circle, an ellipse, and a quadrangle exemplified as the plane shape of the valve plate, an ellipse or a quadrangle is desirable. This is because in contrast to a true-circular shape of the valve plate that causes uniform stress to be applied on its peripheries and makes it difficult to break which in turn increases the cell-to-cell difference in the operating pressure of the safety valve, while an elliptic or rectangular shape of the valve plate causes stronger stress to be applied on the longer side and surely causes the valve plate to break starting from the longer side, thus reducing the cell-to-cell difference in the operating pressure of the safety valve.

A tenth aspect of the invention is characterized in that the safety valve according to the first aspect of the invention, wherein the valve plate and the sealing plate are molded in one piece.

Such a configuration reduces the number of components of the safety valve and makes it possible to decrease the costs for manufacturing the cells.

An eleventh aspect of the invention is characterized in that the safety valve according to the first aspect of the invention, wherein besides the above-mentioned break groove, a break aiding groove is formed near the periphery of the above-mentioned valve plate.

In such a configuration, as the internal cell pressure rises, a displacement also increases near the breaks of the dome portion, so that particularly for cells with a small-sized valve plate (thin cells), even a small rise in the internal cell pressure ensures stable operations. Further, in the manufacturing of the valve plate, its tolerance can be relaxed, to facilitate quality control and metal-mold adjustment, thus improving the productivity.

To achieve the above-mentioned objects, a twelfth aspect of the invention comprises a valve plate forming step of forming a valve plate wherein a sheet-shaped sealing plate for sealing the cells is provided with a dome-shaped dome portion and a break groove is formed at the middle or near it for facilitating the breaking of the valve plate by plasticity working.

By such a method, the cell safety valve according to the first aspect of the invention can be formed when the components of the sealing plate are worked, thus improving the productivity.

A thirteenth aspect of the invention is characterized in that the method according to the twelfth aspect of the invention, wherein during the above-mentioned valve plate forming step, the valve plate is formed between an imaginary plane flush with the outside surface of the above-mentioned sealing plate and an imaginary plane flush with the inside surface of the above-mentioned sealing plate.

By such a method, the cell safety valve according to the sixth aspect of the invention can be prevented from being damaged when it comes in contact with jigs or any other sealing elements during manufacturing.

A fourteenth aspect of the invention is characterized in that the method according to the twelfth aspect of the invention, wherein during the above-mentioned valve plate forming step, the dome portion is formed in such a way as to bulge in a direction toward the outside of the cells.

By such a method, a further surely operating valve can be made in manufacturing of the cell safety valve according to the seventh aspect of the invention.

A fifteenth aspect of the invention is characterized in that the method according to the twelfth aspect of the invention, wherein during the above-mentioned valve plate forming step, besides the above-mentioned break groove, a break aiding groove is formed near the periphery of the above-mentioned valve plate.

By such a method, a more surely operating valve plate can be made in manufacturing the cell safety valve according to the eleventh aspect of the invention.

A sixteenth aspect of the invention is characterized in that the method according to the twelfth aspect of the invention, wherein after the above-mentioned valve plate forming step, there is included an annealing step of annealing the valve plate.

If a thin valve plate is formed by drawing, the material for the valve plate has higher hardness, so that with the increasing mechanical strength of the material itself, the cell-to-cell difference in the operating pressure of the safety valve may be larger. By annealing the valve plate after the valve plate forming step, however, the valve plate material has lower hardness, so that with the decreasing mechanical strength of the material itself, the cell-to-cell difference in the operating pressure of the safety valve is reduced.

DESCRIPTION OF THE PREFERRED EMBODIMENTS

The following will describe embodiments of the present invention with reference to FIGS. 9 through 23.

First Embodiment

EXAMPLE 1

Figure 11:
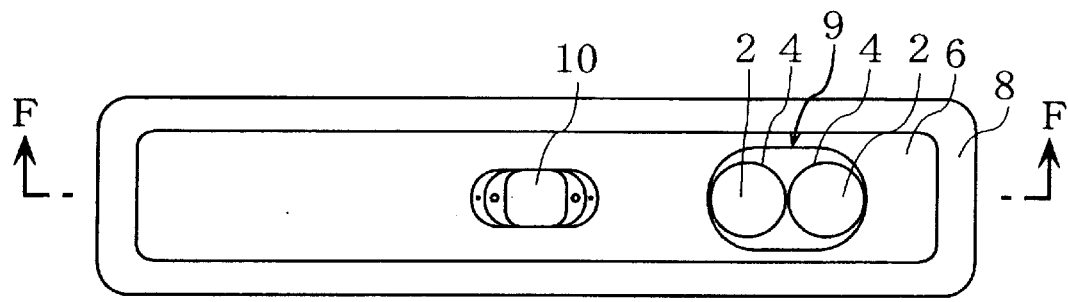
FIG. 11 is a plan view of a non-aqueous electrolyte cell using the safety valve related to the present invention.
Figure 12:
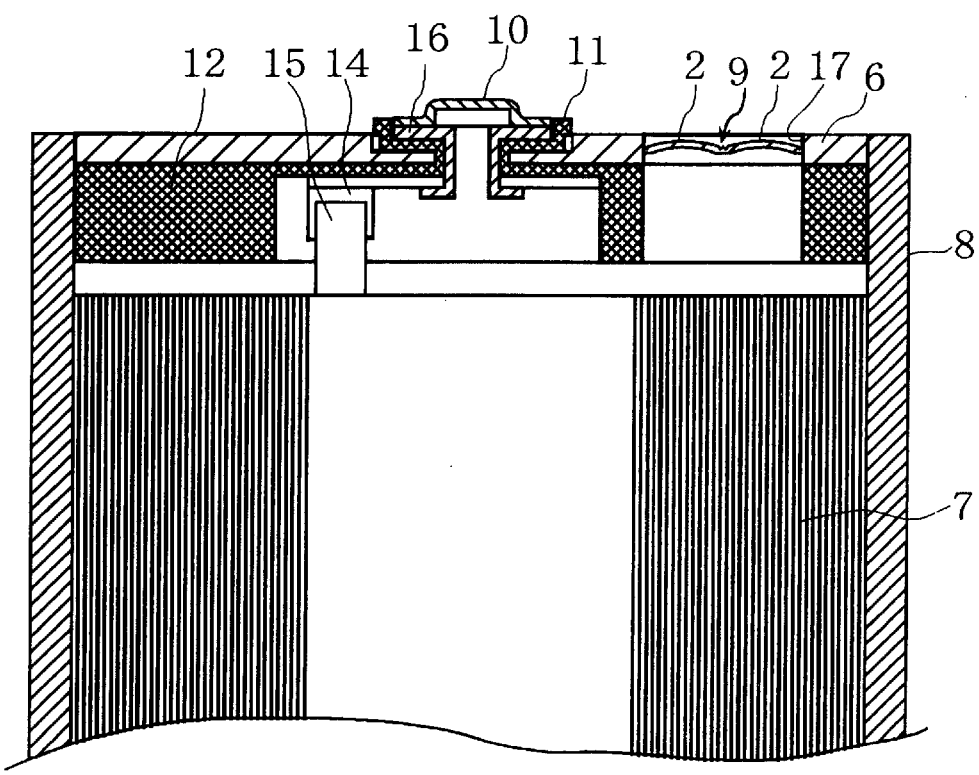
FIG. 12 is a cross-sectional view taken along arrow F—F of FIG. 11.

As shown in FIGS. 11 and 12, a non-aqueous electrolyte cell according to the present invention has a rectangular cell case 8, which houses therein a flat spiral generating element 7 comprising a positive electrode with an aluminum-alloy made foil having an active material layer mainly made of $LiCoO_2$ formed thereon, a negative electrode with a copper-made foil having an active material layer mainly made of graphite formed thereon, and a separator for separating these two electrodes. In the above-mentioned cell can 8 is also poured an electrolyte wherein $LiPF_6$ is dissolved at a ratio of 1 M (mole/liter) in a mixture solvent in which ethylene carbonate (EC) and dimethyl carbonate (DMC) are mixed at a volumetric ratio of 4:6. Further, in the opening hole in the above-mentioned cell can 8 is laser-welded a sealing plate 6 (thickness: 1 mm) made of an aluminum alloy for sealing the cell.

The above-mentioned sealing plate 6 is sandwiched by a sandwiching member 16 together with a gasket 11, an insulating plate 12, and a conducting plate 14, on which sandwiching member 16 is fixed a negative-electrode terminal cap 10. Also, a negative-electrode tab 15 extending from the above-mentioned negative electrode is electrically connected with the above-mentioned negative-electrode terminal cap 10 via the conducting plate 14 and the sandwiching member 16, while the above-mentioned positive electrode is electrically connected with the above-mentioned cell can 8 via a positive-electrode tab (not shown).

In this configuration, the above-mentioned sealing plate 6 and the above-mentioned insulating plate 12 have an opening hole 17, in which the opening hole 17 is provided a safety valve 9 (made of an aluminum alloy like the sealing plate 6) which comprises a thin valve plate (as thick as 50 μm, which is 5.0% of the thickness of the sealing plate 6) and is molded in one piece with the above-mentioned sealing plate 6. This safety valve 9 has such a construction that it breaks to release the gas in the cell to the outside of the cell if the internal cell pressure exceeds a predetermined value. The above-mentioned valve plate has two dome portions 2 which are bulged in a dome shape in a direction toward the outside of the cell, on the peripheries of which dome portions 2•2 are formed break grooves 4•4 in such a manner as to be adjacent with each other at around the middle of the safety valve 9 for facilitating the breaking of the valve plate. Also, the safety valve 9 as a whole is formed between an imaginary plane 18a flush with an outside surface 6a of the above-mentioned sealing plate 6 and an imaginary plane 18b flush with an inside surface 6b of the above-mentioned sealing plate 6.

The non-aqueous electrolyte cell having the above-mentioned construction was made as follows.

First, a 90 weight % of $LiCoO_2$ as a positive-electrode activating material, a 5 weight % of carbon black as a conducting agent, another 5 weight % of poly-vinylidene fluoride as a binder, and an N-methyl-2-pyrolidon (NMP) as a solvent were mixed to prepare slurry, which was then applied to both surfaces of aluminum foil acting as the positive-electrode collector. Then, the solvent was dried and compressed by a roller to a predetermined thickness and then cut to predetermined width and length, to subsequently weld a positive-electrode collector tab made of an aluminum alloy.

Concurrently with this step, a 95 weight % of graphite powder as a negative-electrode activating material, a 5 weight % of poly-vinylidene fluoride as a binder, and an NMP solution as a solvent were mixed to prepare slurry, which was then applied to both surfaces of copper foil acting as a negative-electrode collector. Then, the solvent was dried and compressed by a roller to a predetermined thickness and cut to predetermined width and length, to subsequently weld a negative-electrode collector tab made of nickel.

Next, the above-mentioned positive and negative electrodes were wound with a separator formed by a polyethylene-made micro-porous thin film therebetween to form a flat spiral power-generating element 7, which was inserted to the cell can 8.

Concurrently with this step, on the other hand, a thin-sheet portion was formed at a predetermined position on the sealing plate by forging (a type of plasticity working) and then subjected to coining (another type of plasticity working) to form a break groove 4 to thereby provide the dome portion 2, thus forming a safety valve 9 molded in one piece with the sealing plate 6. Then, the sealing plate 6, the gasket 11, the insulating plate 12, and the conducting plate 14 were sandwiched by the sandwiching member 16.

Then, the cell can 8 and the sealing plate 6 were laser-welded to each other, to pour an electrolyte into the cell can 8 and fix the negative-electrode terminal cap 10 on the sandwiching member 16, thus making the non-aqueous electrolyte cell.

Thus made cell is hereinafter referred to as a cell A1 according to the present invention.

EXAMPLE 2

This example is the same as the above-mentioned example 1 except that after the sealing plate 6 with the safety valve 9 formed thereon was made, the safety valve 9 is annealed.

Thus made cell is hereinafter referred to as a cell A2 according to the present invention.

EXAMPLE 3

This example is the same as the above-mentioned example 1 except that the break groove 4 for facilitating the breaking of the valve plate was formed in the periphery of only one of the two dome portions 2·2.

Thus made cell is hereinafter referred to as a cell A3 according to the present invention.

COMPARATIVE EXAMPLE 1

This Comparative example used such a prior art valve as described in Japanese Unexamined Patent Application No. 10-106524 (see FIGS. 1 through 4).

Thus made cell is hereinafter referred to as a comparison cell X1.

COMPARATIVE EXAMPLE 2

Figure 1:
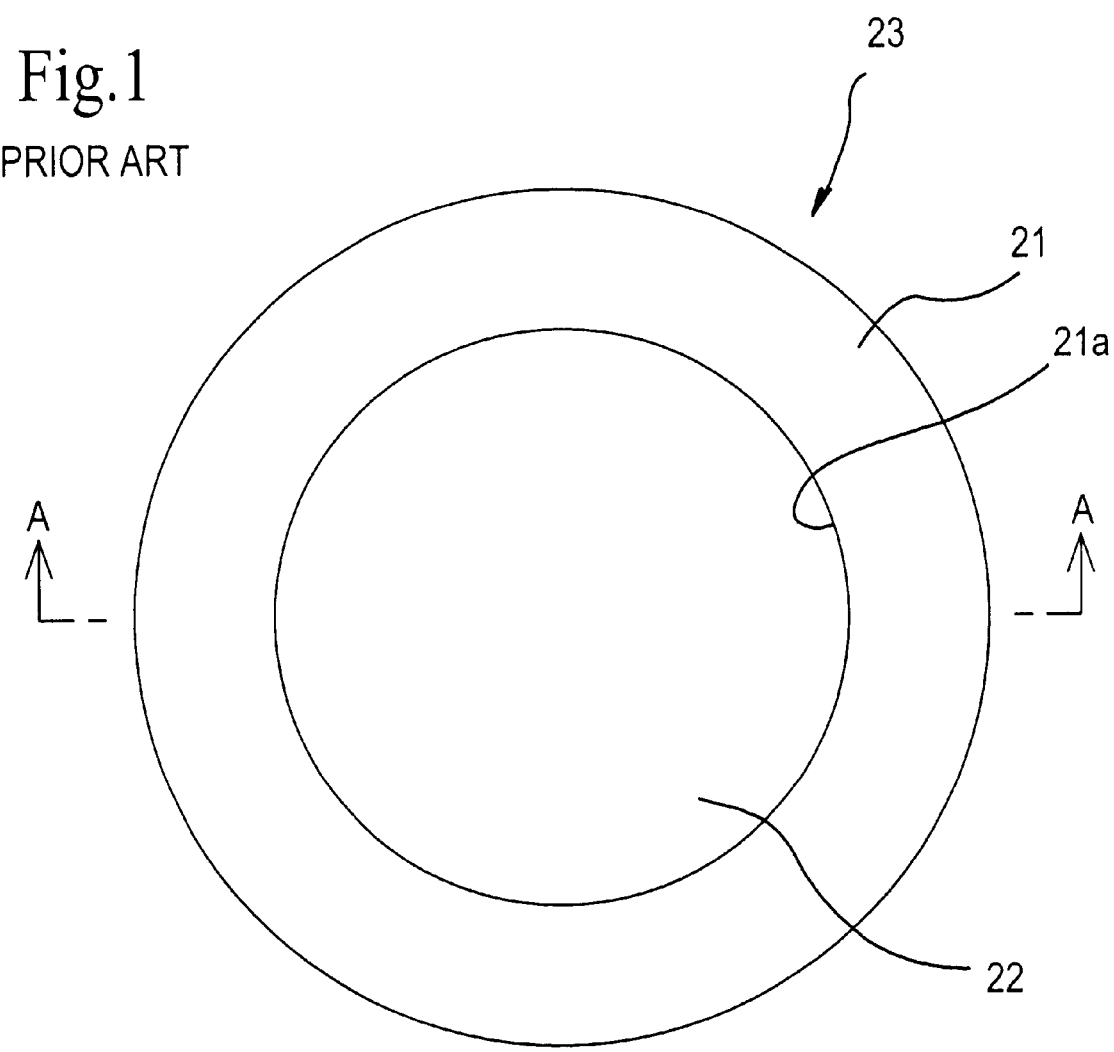
FIG. 1 is a plan view of a safety valve related to a prior art example.
Figure 2:
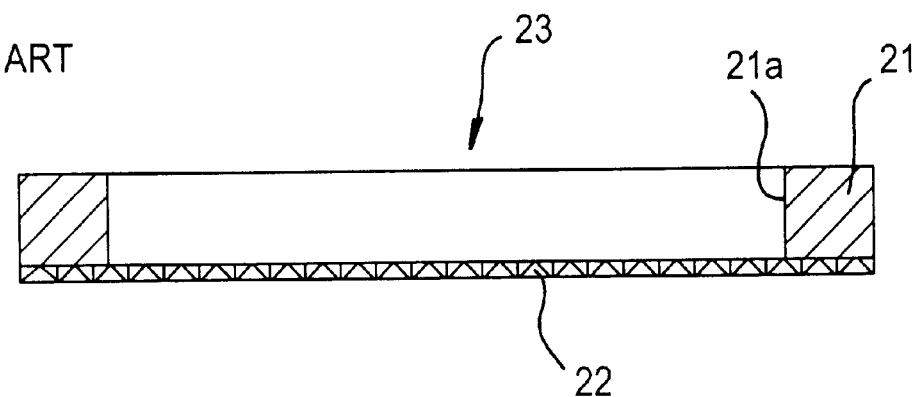
FIG. 2 is a cross-sectional view taken along arrow A—A of FIG. 1.
Figure 3:
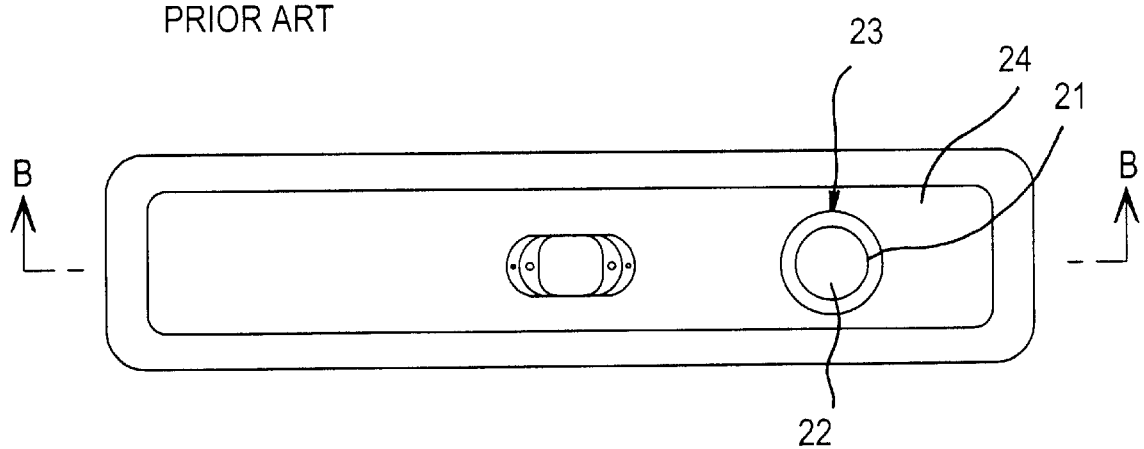
FIG. 3 is a plan view of a non-aqueous electrolyte cell using the safety valve related to the prior art example.
Figure 4:
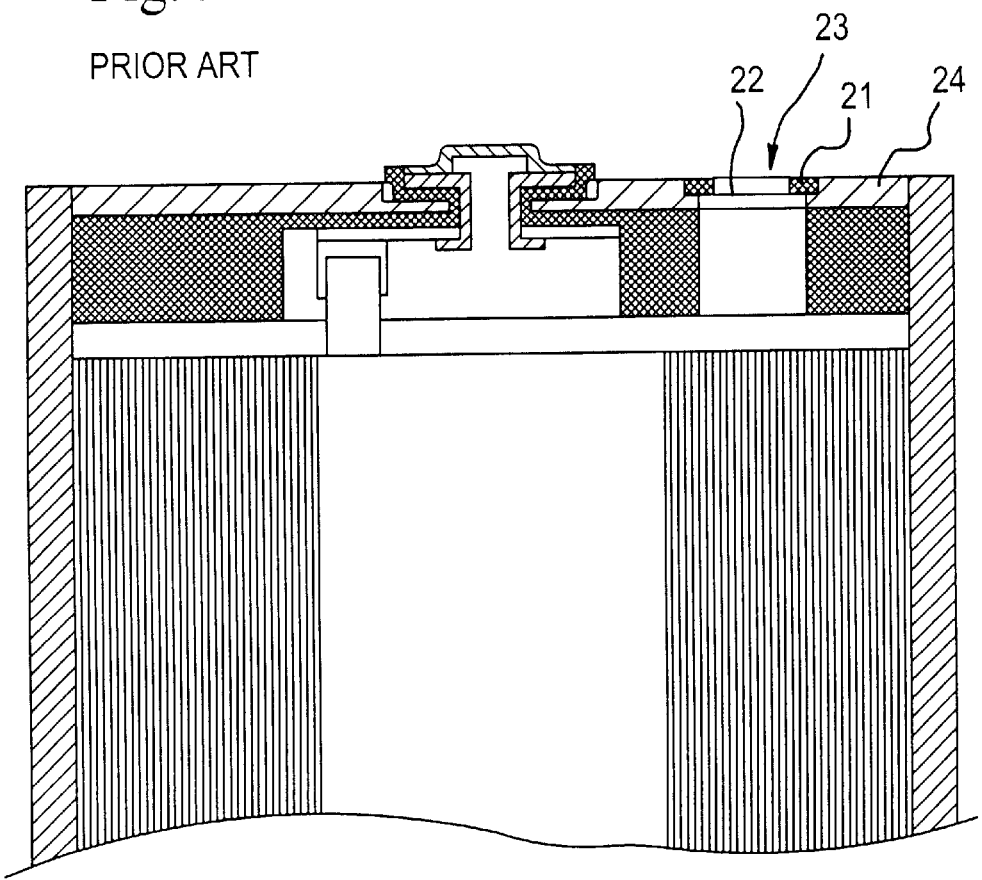
FIG. 4 is a cross-sectional view taken along arrow B—B of FIG. 3.
Figure 5:
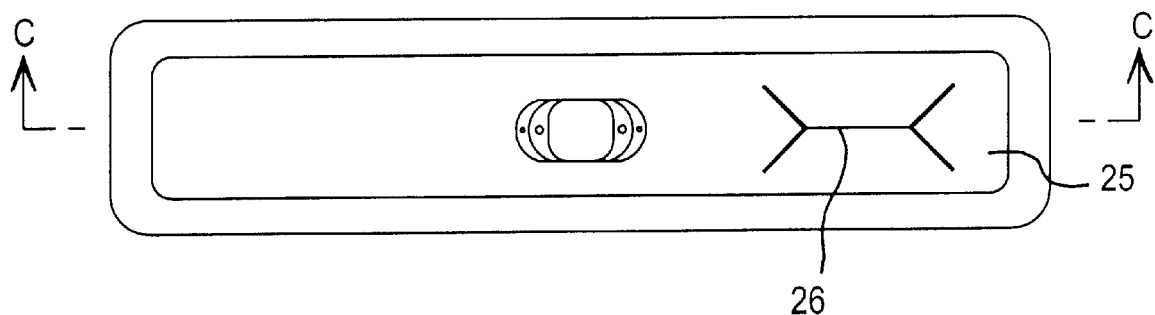
FIG. 5 is a plan view of a safety valve related to another prior art example.
Figure 6:
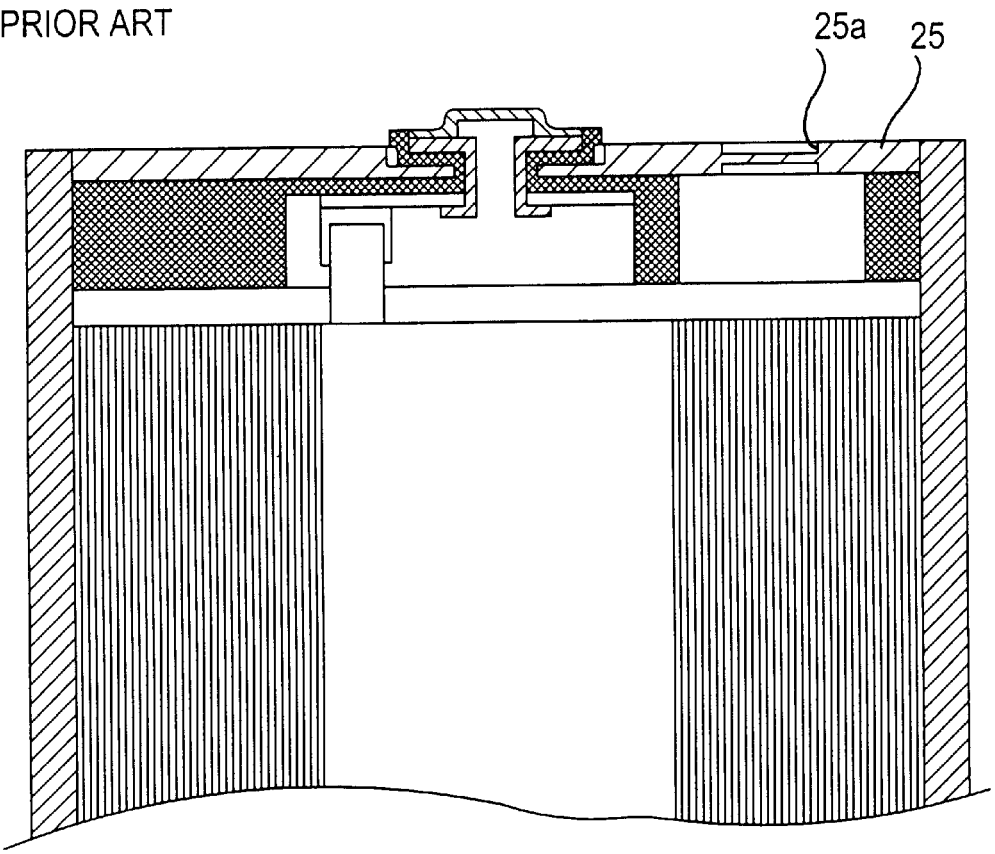
FIG. 6 is a cross-sectional view taken along arrow C—C of FIG. 5.

This Comparative example used such a prior art valve as described in Japanese Unexamined Patent Application No. 11-250885 (see FIGS. 5 and 6).

Thus made cell is hereinafter referred to as a comparison cell X2.

COMPARATIVE EXAMPLE 3

Figure 7:
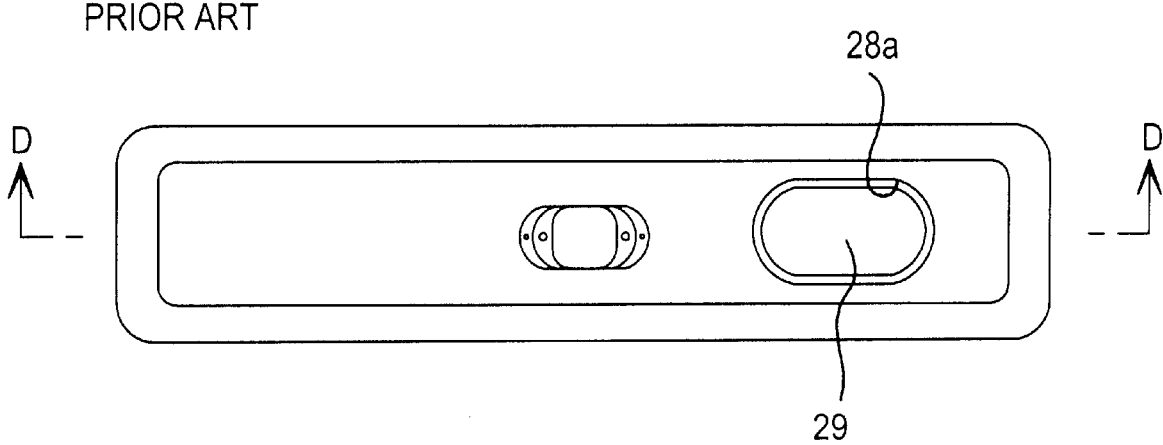
FIG. 7 is a plan view of a safety valve related to further another prior art example.
Figure 8:
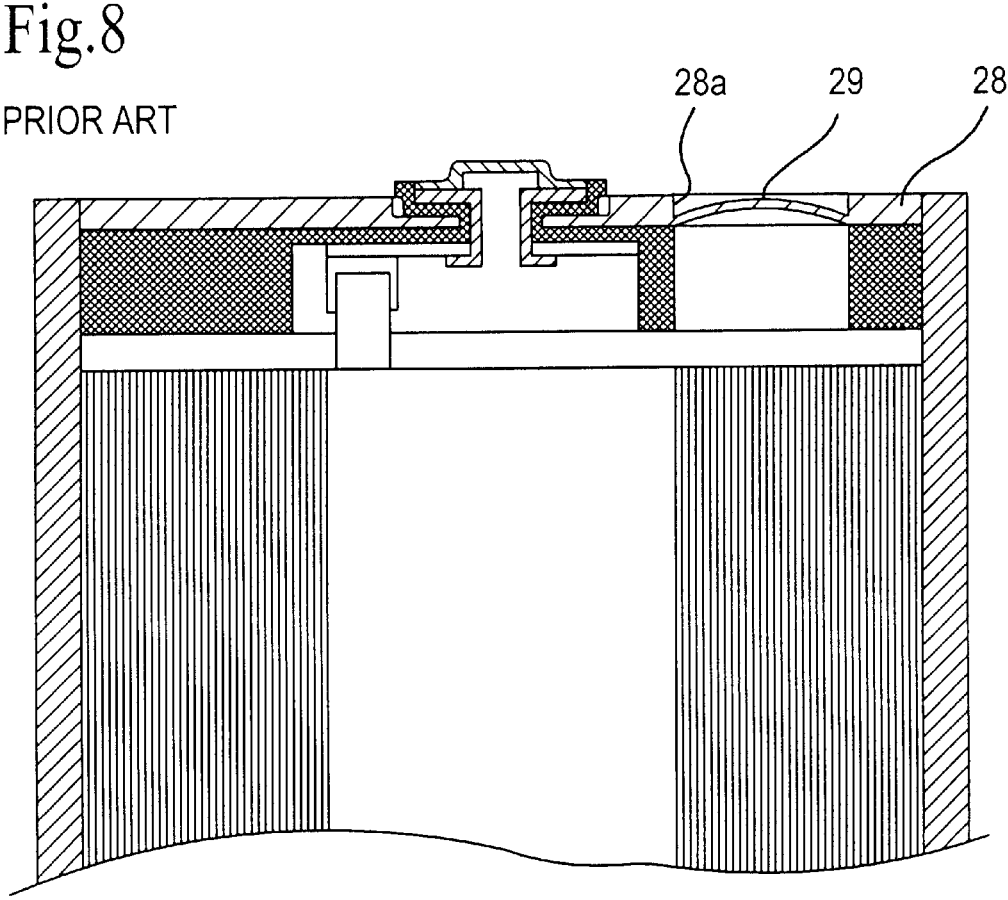
FIG. 8 is a cross-sectional view taken along arrow D—D of FIG. 7.
Figure 9:
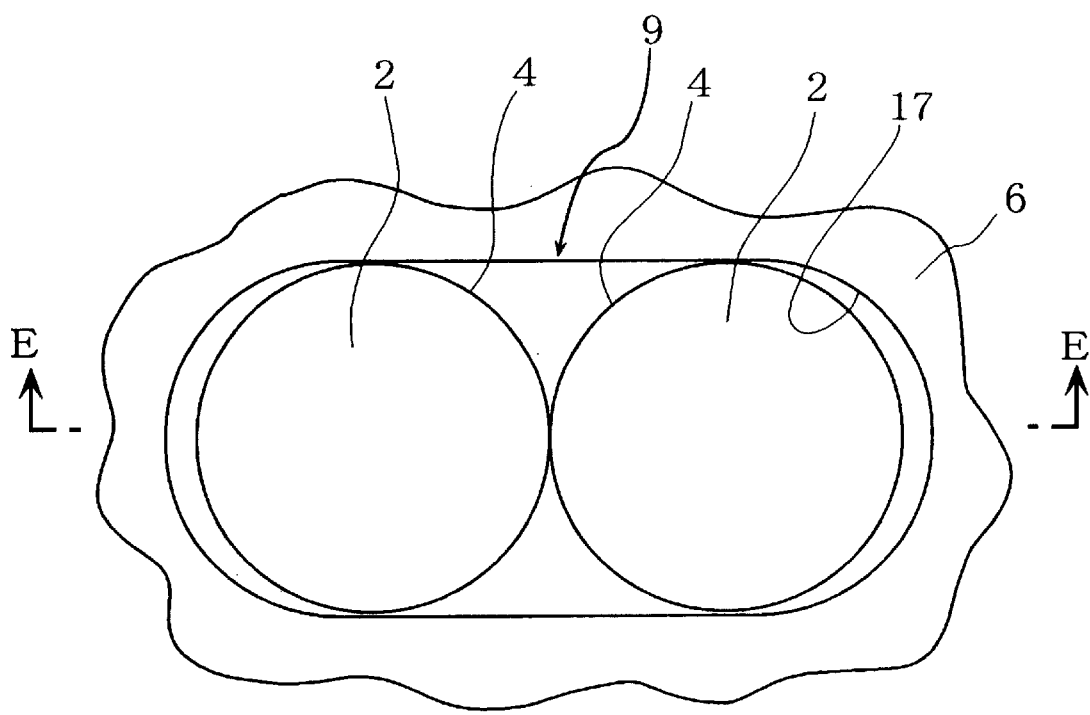
FIG. 9 is a plan view of a safety valve related to an embodiment of the present invention.
Figure 10:
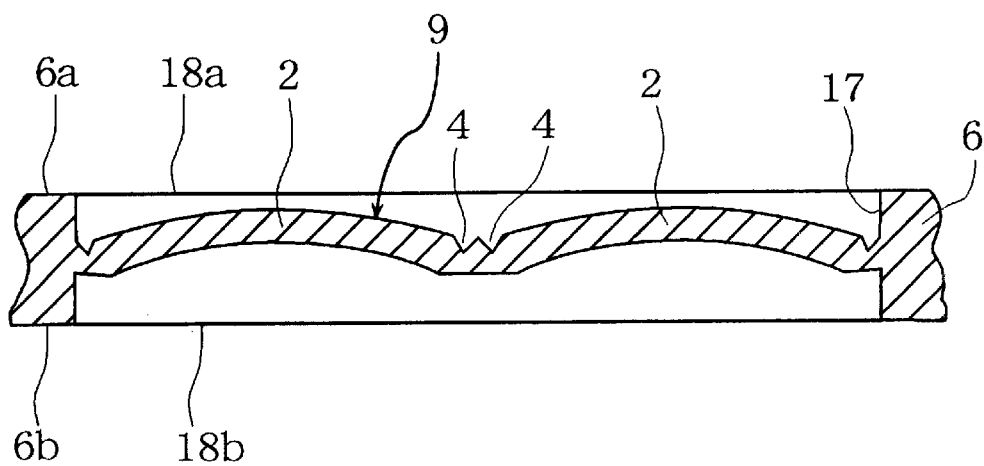
FIG. 10 is a cross-sectional view taken along arrow E—E of FIG. 9.

This Comparative example used such a prior art valve as described in Japanese Unexamined Patent Application No. 11-273640 (see FIGS. 7 and 8).

Thus made cell is hereinafter referred to as a comparison cell X3.

Experiment 1

The above-mentioned cells A1 and A2 according to the present invention and comparison cells X1 through X3 were subjected to a thermal shock test consisting of 100 repetitive cycles of a thermal shock each of the cycles keeping them at 70° C. for one hour and then at −30° C. for another one hour to subsequently checked for the number of leakage cases of the electrolyte, a thermal test checking for breaking and ignition of the cells after they are heated with a burner, and an operating-pressure difference test checking a cell-to-cell difference in the operating pressure of the safety valve, the results of which are given in Table 1 below.

TABLE 1

|  | Cell A1 according to the invention | Cell A2 according to the invention | Comparison cell X1 | Comparison cell X2 | Comparison cell X3 |
|---|---|---|---|---|---|
| Planar shape of safety valve | Ellipse | Ellipse | True circle | — | Ellipse |
| Break portion shape | Circle | Circle | Circle | Y-shape | Ellipse |
| Annealing | Not done | Done | Not done | — | Not done |
| Break groove at middle of safety valve | Formed | Formed | Not formed | Formed | Not formed |
| Electrolyte leakage as a result of thermal shock | 0/50P | 0/50P | 22/50P | 0/50P | 17/50P |
| Number of cell break ignition and break cases as a result of thermal test | 0/10P | 0/10P | 0/10P | 3/10P | 0/10P |
| Operating pressure difference (MPa) | ±0.29 | ±0.19 | ±0.68 | ±0.39 | ±0.39 |

As can be apparent from Table 1 above, the comparison cell X1 encountered leakage of the electrolyte in the thermal shock test and an increase in the operating pressure difference in the operating-pressure difference test, the comparison cell X2 encountered burst and ignition of the cell in the thermal test, and the comparison cell X3 encountered leakage of the electrolyte. In contrast to these, the cells A1 and A2 according to the present invention encountered no leakage of the electrolyte in the thermal shock test nor burst nor ignition in the thermal test but encountered even a decrease in the operating pressure difference in the operating-pressure difference test.

These results indicate that the cells A1 and A2 according to the present invention have been improved in various items of performance required for the safety valve 9 as compared to the comparison cells X1 through X3.

The cell A2 according to the present invention, however, has been recognized to have a smaller operating-pressure difference in the operating-pressure difference test than the cell A1 according to the present invention. With this, therefore, it is apparent that in order to decrease the difference in the operating pressure, the safety valve should preferably be subjected to annealing processing.

Experiment 2

The thermal shock test and the operating-pressure difference test were conducted on safety valves having a variety of thickness values under almost the same conditions as the above-mentioned experiment 1, the results of which are given in Table 2. Note here that in this experiment 2, the thickness of the sealing plate was kept at 1.0 mm and the safety valve 9 was not annealed.

TABLE 2

| Thickness of safety valve | 0.5 μm | 1.0 μm | 10 μm | 50 μm | 100 μm | 150 μm |
|---|---|---|---|---|---|---|
| Ratio of safety valve thickness with respect to sealing plate thickness | 0.05% | 0.1% | 1.0% | 5.0% | 10.0% | 15.0% |
| Operating pressure difference (MPa) | ±0.19 | ±0.24 | ±0.27 | ±0.39 | ±0.44 | ±0.88 |
| Leakage of electrolyte as a result of thermal shock test | 20/50P | 0/50P | 0/50P | 0/50P | 0/50P | 0/50P |

As can be apparent from Table 2 above, a safety valve with a thickness of 0.5 μm (which is 0.05% of the thickness of the sealing plate) encountered leakage of the electrolyte in the thermal shock test, while a safety valve with a thickness of 150 μm (which is 15.0% of the thickness of the sealing plate) encountered an increase in the operating-pressure difference in the operating-pressure difference test. As against these, safety valves with thickness values of 1 through 100 μm (which are 0.1 through 10.0% of the thickness of the sealing plate) encountered no leakage of the electrolyte in the thermal shock test and even a reduced operating-pressure difference in the operating-pressure difference test.

Those results indicate that the safety valve preferably has a thickness of 0.1 through 10.0% of the thickness of the sealing plate.

Experiment 3

The operating-pressure difference test was conducted on the above-mentioned cells A1 and A3 according to the present invention under the same conditions as the above-mentioned experiment 1, the results of which are given in Table 3 below. Note here that the thickness of the sealing plate was kept at 1.0 mm.

TABLE 3

|  | Cell A1 according to the invention | Cell A3 according to the invention |
|---|---|---|
| Planar shape of safety valve | Ellipse | |
| Shape of break groove | Circle | |
| Annealing | Done | |
| Ratio of safety valve thickness with respect to sealing plate thickness | 5.0% | |
| Number of break grooves provided | 2 | 1 |
| Operating pressure difference (MPa) | ±0.19 | ±0.29 |

As can be seen from Table 3, the cell A1 according to the present invention with the break groove 4 formed in the periphery of both dome portions 2 encountered a decrease in the operating-pressure difference, whereas the cell A3 according to the present invention with the break groove 4 formed in the periphery of only one of the two dome portions 2 encountered an increase in the operating-pressure difference.

Therefore, it can be seen that the break groove 4 should preferably be formed in the periphery of both dome portions 2.

Second Embodiment

Figure 13:
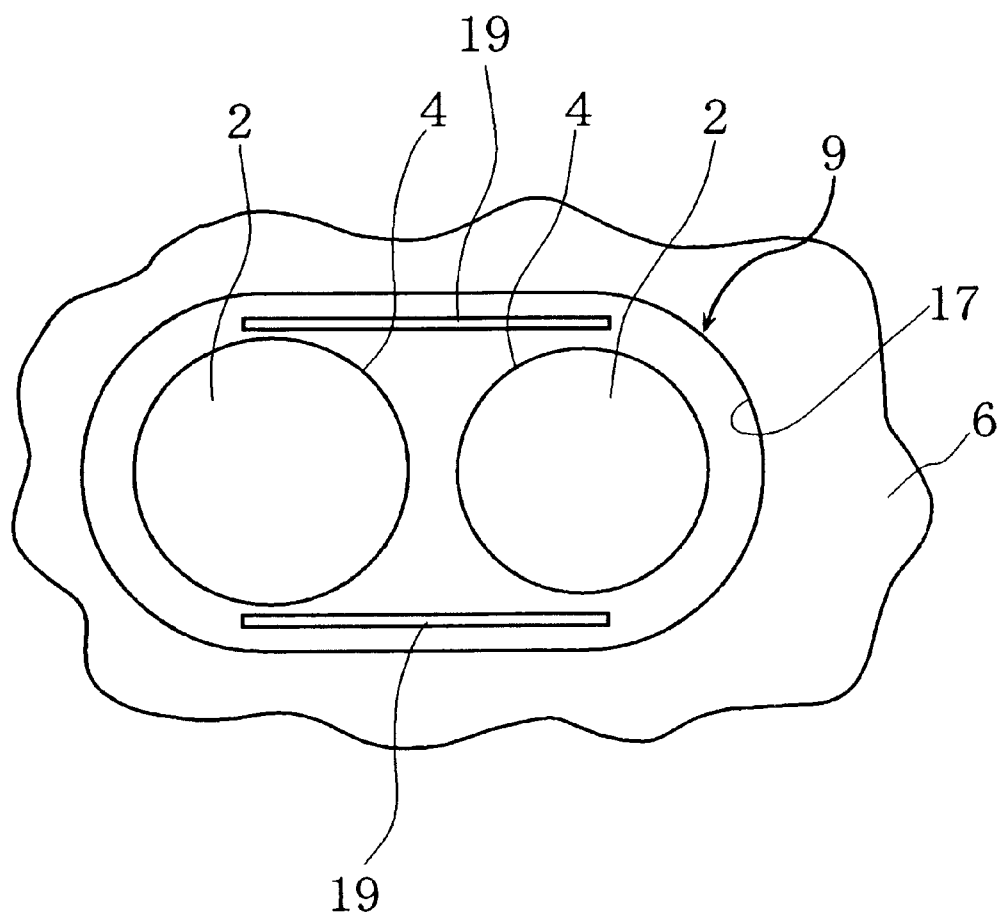
FIG. 13 is a plan view of a safety valve related to another embodiment of the present invention.

As shown in FIG. 13, this embodiment has the same configuration as the above-mentioned first embodiment except that as shown in FIG. 13, two break aiding grooves 19•19 are formed in sites (i.e., those separate from the dome portions 2•2) in which the break groove 4 is not formed near the periphery of the safety valve 9.

Such a configuration has the following effects.

Figure 16:
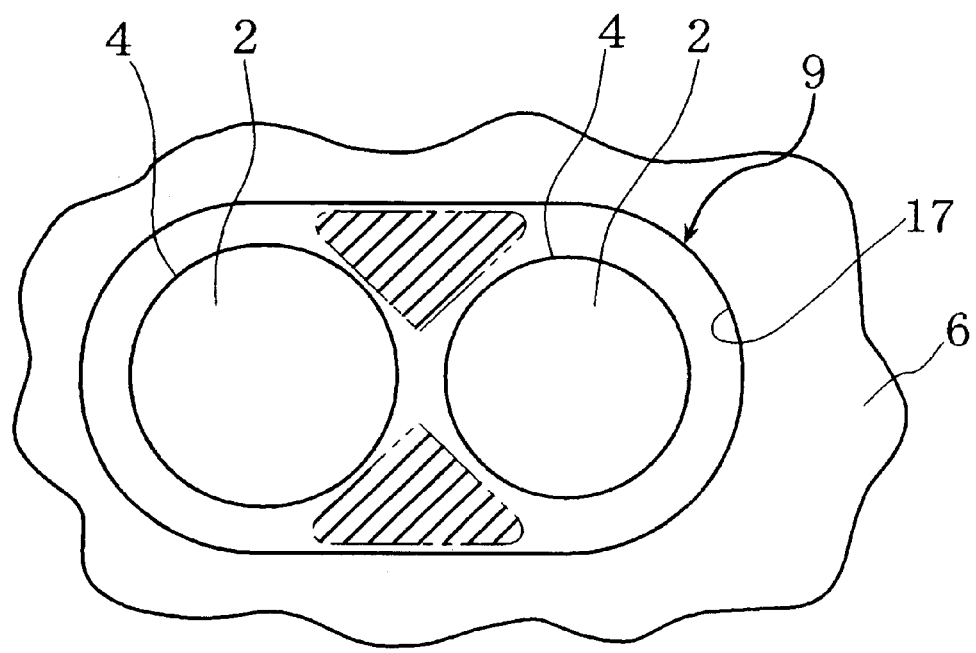
FIG. 16 is a plan view showing a portion of the valve plate that has higher bending strength.
Figure 17:
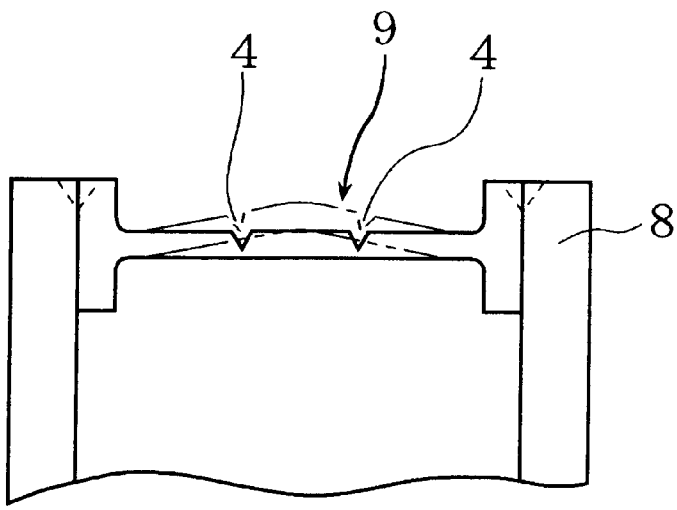
FIG. 17 is an illustration showing an operating state of the safety valve of FIG. 16 when the inner pressure of a cell provided with it has risen.
Figure 18:
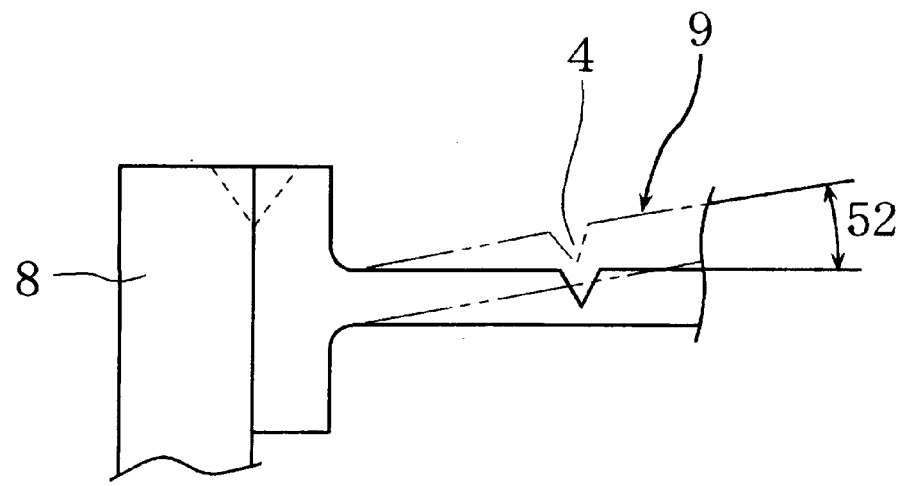
FIG. 18 is an enlarged view of an important portion of FIG. 17.

That is, as shown in FIG. 16, when the above-mentioned break aiding groove 19 is not formed, the sites (hatched areas in FIG. 16) separate from the dome portions 2•2 have higher bending strength, so that when the internal cell pressure rises, a displacement (a flexure of the safety valve 9) 52 decreases near a break at the dome portions 2•2. Therefore, particularly for a thin cell (i.e., a cell with a small safety valve 9), a small rise in the inner pressure is not enough for stable operations. Further, the tolerance for the thickness of the break groove is stringent in manufacturing of the safety valve 9, to make the quality control and metal mold adjustment difficult, thus decreasing the productivity.

Figure 14:
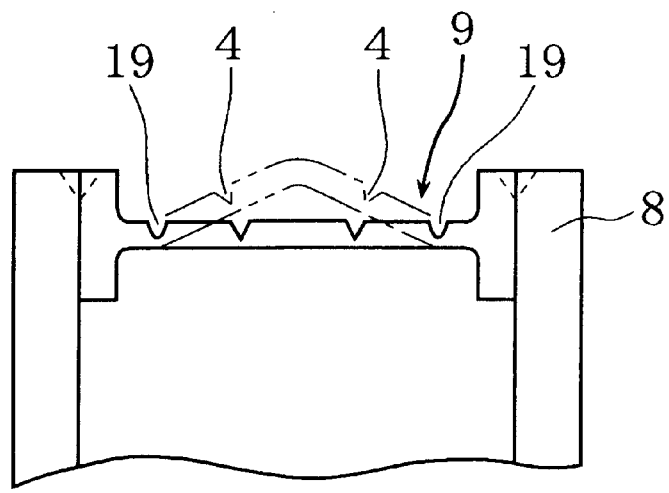
FIG. 14 is an illustration showing an operating state of the safety valve of FIG. 13 when the inner pressure of a cell provided with it has risen.
Figure 15:
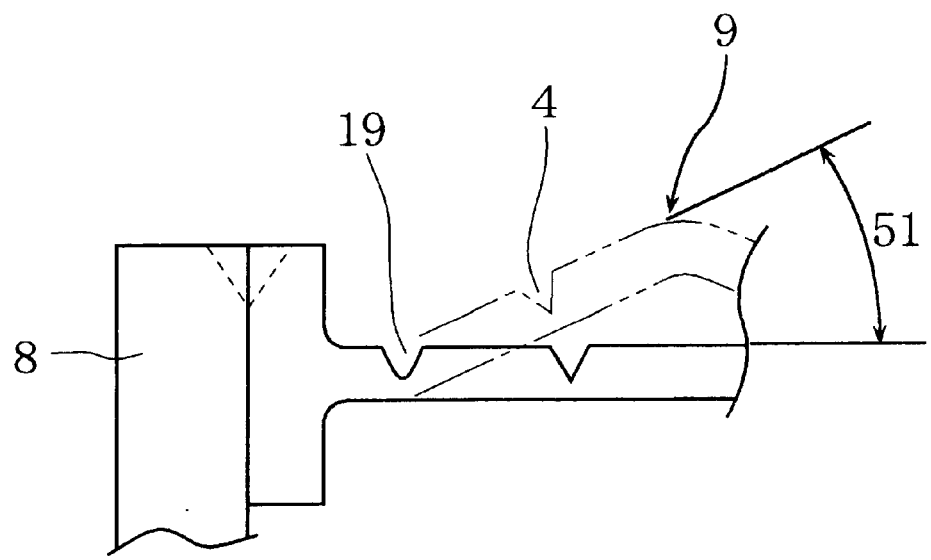
FIG. 15 is en enlarged view of an important portion of FIG. 14.

In contrast, when the two break aiding grooves 19•19 are formed as shown in FIG. 13, the sites (i.e., those in FIG. 13 corresponding to the hatched areas in FIG. 16) separate from the dome portions 2•2 have lower bending strength, so that as shown in FIGS. 14 and 15, when the internal cell pressure rises, a displacement 51 increases near a break at the dome portions 2•2. Therefore, particularly for a cell with a small safety valve 9, even a small rise in the inner pressure is enough for stable operations. Further, the tolerance for the thickness of the break grooves 3 and 4 can be lenient in the manufacturing of the safety valve 9, to facilitate the quality control and metal mold adjustment, thus improving the productivity.

Figure 19:
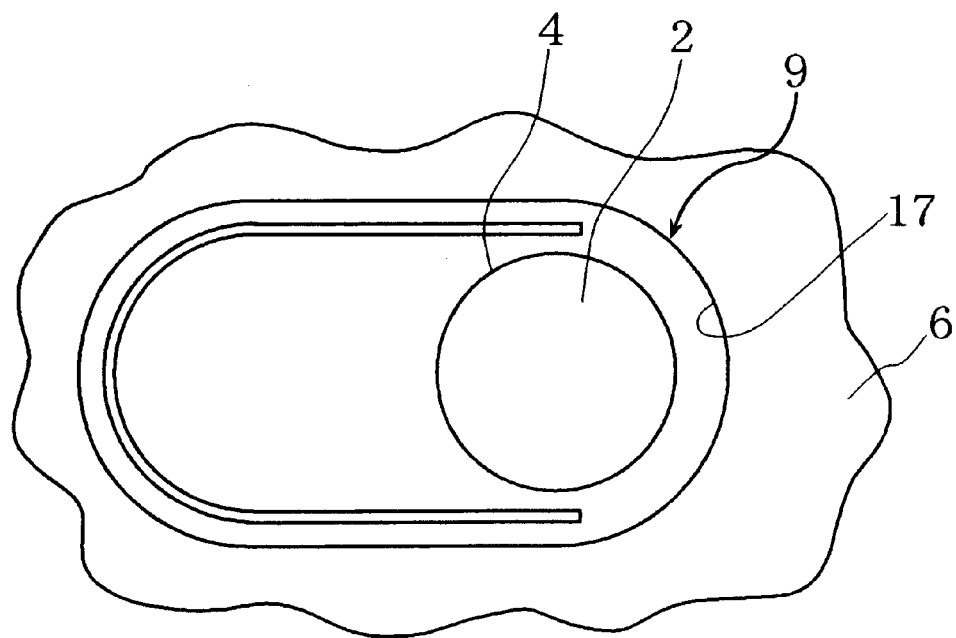
FIG. 19 is a plan view of a safety valve related to further another embodiment of the present invention.

The break aiding grooves 19•19, however, are not limited to such a construction as having two dome portions 2 but may have three dome portions 2 or, as shown in FIG. 19, three dome portions 2 or more. Also, as shown in FIG. 19, they may have only one dome portion 2. In this case also, the break aiding grooves 19 are formed in a site where the break groove 4 is not formed near the periphery of the safety valve 9.

Other Items

Figure 20:
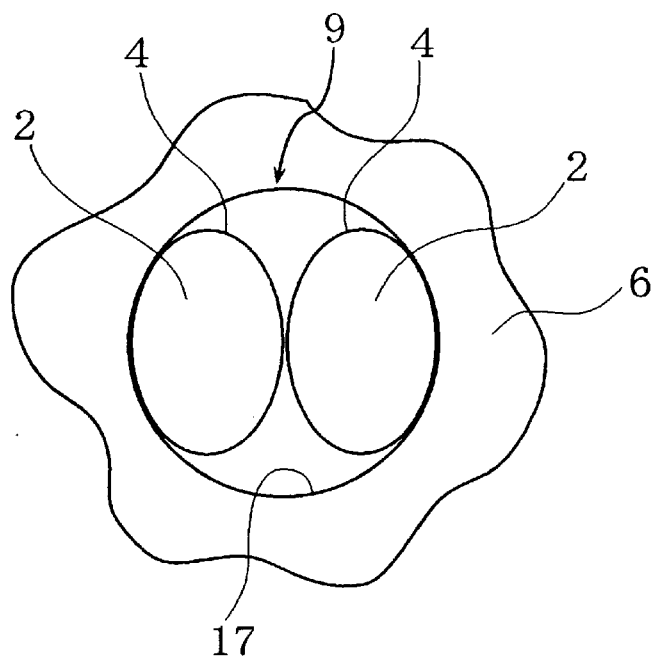
FIG. 20 is a plan view of a safety valve related to further another embodiment of the present invention.
Figure 21:
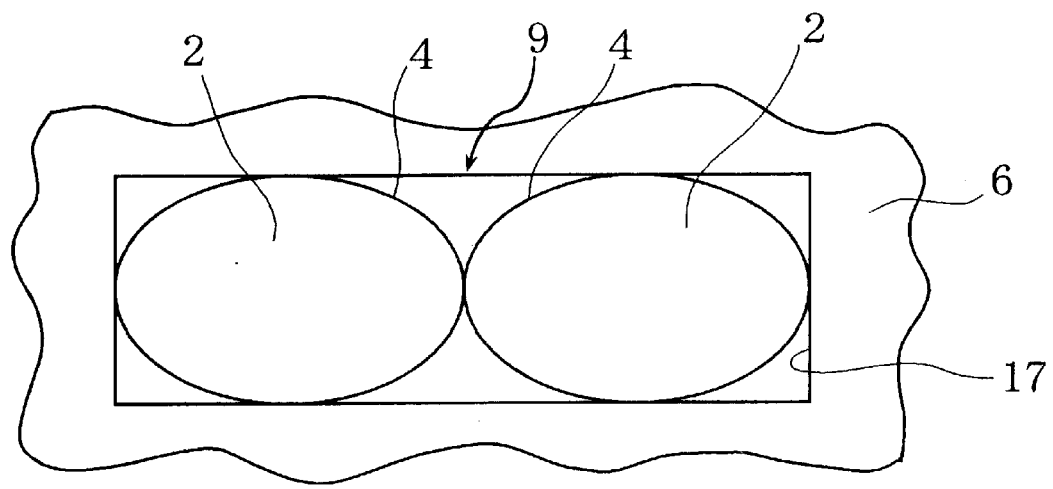
FIG. 21 is a plan view of a safety valve related to further another embodiment of the present invention.
Figure 22:
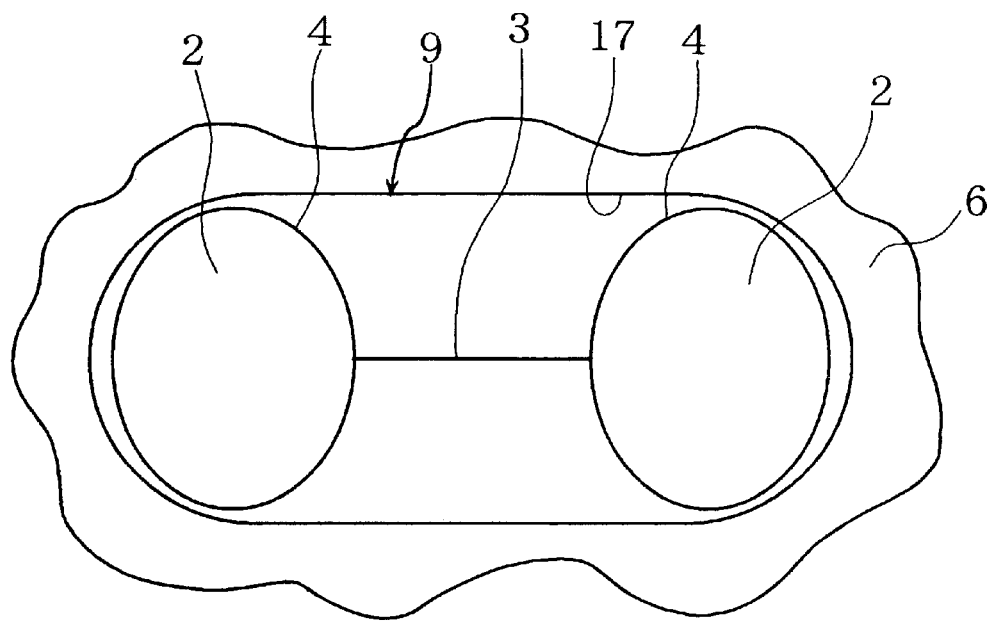
FIG. 22 is a plan view of a safety valve related to further another embodiment of the present invention.

Although the above-mentioned two embodiments employed an ellipse as the planar shape of the safety valve and a true circle as the planar shape of the dome portions 2•2, they are not limiting. For example, as shown in FIGS. 20 and 21, the planar shape of the safety valve 9 may be a true circle and a quadrangle, and the dome portions 2•2 may be elliptic or, as shown in FIG. 22, although the planer shape of the safety valve 9 is elliptical, both of them may be elliptic to be interconnected via the break groove 3.

Figure 23:
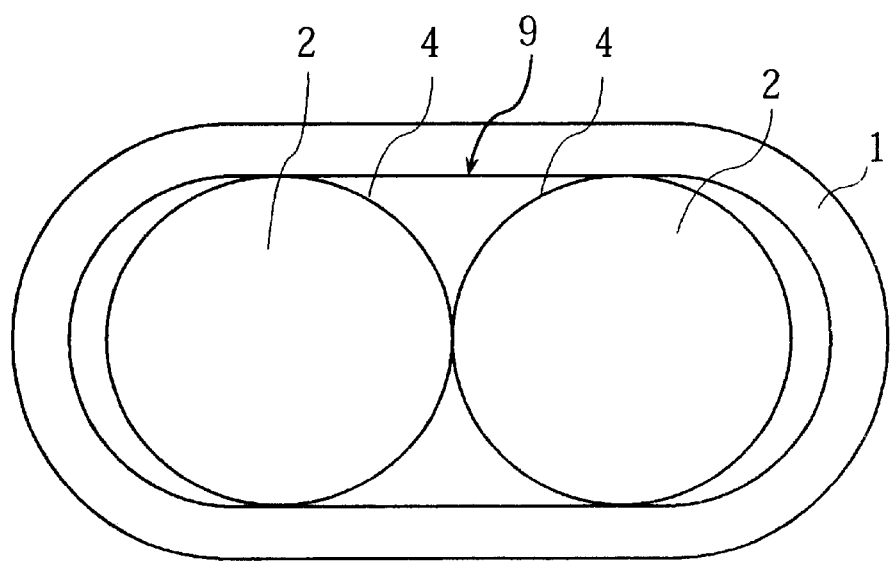
FIG. 23 is a plan view of a safety valve related to further another embodiment of the present invention.

Also, although the safety valve 9 and the sealing plate 6 are molded in one piece, this construction is not limiting, so that as shown in FIG. 23, the framework 1 and the valve plate of the safety valve 9 may be integrated with each other so that the framework 1 and the sealing plate 6 can be fixed to each other by use of laser welding in construction.

Further, the thickness of the valve plate of the safety valve 9 is not limited to 5.0% of the thickness of the sealing plate 6 but may be in a range of 0.1 through 10% for obtaining good results.

In addition, the materials of the sealing plate 6 and the safety valve 9 are not limited to aluminum alloys but may be a pure aluminum, while the present invention of course is not limited in application to the above-mentioned non-aqueous electrolyte cell but to those cells using vulnerable materials as aluminum etc. for the sealing plate 6 or the safety valve 9.

If the present invention is applied to the above-mentioned non-aqueous electrolyte cell, however, as the material of the positive electrode such substances may appropriately be used as, besides the above-mentioned $LiCoO_2$, for example $LiNiO_2$, $LiMn_2O_4$ or their composite substances such as composite oxides containing lithium, while as the material of the negative electrode such substances may appropriately be used as, besides the above-mentioned carbon materials, lithium metals, lithium alloys, or metal oxides (tin oxides etc.). Further, the solvent of the electrolyte is not limited to the above-mentioned substance but may be a mixture obtained by mixing at an appropriate ratio such a solution having a relatively high dielectric constant as propylene carbonate, ethylene carbonate, vinylene carbonate, or γ-butyrolactane and such a solution having a low viscosity and a low boiling point as diethyl carbonate, dimethyl carbonate, methyl-ethyl carbonate, tetra-hydrofuran, 1,2-dimethoxylethane, 1,3-dioxolanation, 2-methoxytetrahydrofuran, or dimethylether. Also, the electrolyte of the cells may be, besides the above-mentioned $LiPF_6$, $LiAsF_6$, $LiClO_4$, $LiBF_4$, $LiCF_3SO_3$, etc.

What is claimed is:

1. A cell safety valve comprising a thin valve plate formed on a sheet-shaped sealing plate for sealing a cell, said thin valve plate breaking when inner pressure of said cell exceeds a predetermined value, so that a gas in said cell is released to the outside, wherein said thin valve plate comprises at least one dome-shaped dome portion, and a break groove to facilitate the breaking of said thin valve plate is formed at the periphery of said at least one dome portion, a portion of said break groove being located in the middle of said thin valve plate or near the middle of said thin valve plate.

2. The cell safety valve according to claim 1, wherein said valve plate as a whole is disposed between an imaginary plane flush with the outside surface of said sealing plate and an imaginary plane flush with the inside surface of said sealing plate.

3. The cell safety valve according to claim 1, wherein said dome portion bulges in a direction toward the outside of said cell to form a dome shape.

4. The cell safety valve according to claim 1, wherein the thickness of said valve plate is regulated to 0.1 through 10% of the thickness of said sealing plate.

5. The cell safety valve according to claim 1, wherein the planar shape of said valve plate is a true circle, ellipse, or quadrangle.

6. The cell safety valve according to claim 1, wherein said valve plate and said sealing plate are molded in one piece.

7. The cell safety valve according to claim 1, wherein besides said break groove, a break aiding groove is formed near the periphery of said valve plate.

8. A method for manufacturing a cell safety valve, said cell safety valve comprising a thin valve plate formed on a sheet-shaped sealing plate for sealing said cell, said thin valve plate breaking when inner pressure of said cell exceeds a predetermined value, so that a gas in said cell is released outside of said cell; said method comprising the step of:

forming said thin valve plate having at least one dome-shaped dome portion on said sheet-shaped sealing plate for sealing said cell, wherein a break groove to facilitate the breaking of said valve plate is formed at a periphery of said at least one dome portion, a portion of said break groove being located in the middle of said thin valve plate or near the middle of said thin valve plate, said thin valve plate being formed by plasticity working.

9. The method according to claim 8, wherein during said valve plate forming step, said valve plate is formed between an imaginary plane flush with the outside surface of said sealing plate and an imaginary plane flush with the inside surface of said sealing plate.

10. The method according to claim 8, wherein during said valve plate forming step, said some portion is formed so as to bulge in a direction toward the outside of said cell.

11. The method according to claim 8, wherein during said valve plate forming step, besides said break groove, a break aiding groove is formed near the periphery of said valve plate.

12. The method according to claim 8, further comprising the step of annealing said valve plate after said valve plate forming step.

13. A cell safety valve, comprising a thin valve plate formed on a sheet-shaped sealing plate for sealing a cell, said thin valve plate breaking when inner pressure of said cell exceeds a predetermined value, so that a gas in said cell is released the outside of said cell;

wherein said thin valve plate comprises at least one dome-shaped dome portion, and a break groove to facilitate the breaking of said thin valve plate is formed in the middle of said thin valve plate or near the middle of said thin valve plate but outside said at least one dome portion.

14. The cell safety valve according to claim 13, wherein said break groove is formed at the periphery of said at least one dome portion.

15. A method for manufacturing a cell safety valve, said cell safety valve comprising a thin valve plate formed on a sheet-shaped sealing plate for sealing a cell, said valve plate breaking when inner pressure of said cell exceeds a predetermined value, so that a gas in said cell is released the outside of said cell; said method comprising the step of:

forming said thin valve plate having at least one dome-shaped dome portion on said sheet-shaped sealing plate for sealing said cell, wherein a break groove to facilitate the breaking of said valve plate is formed in the middle of said valve plate or near the middle of said valve plate but outside said at least one dome portion, said thin valve plate being formed by plasticity working.

16. The method according to claim 15, wherein said break groove is formed at the periphery of said at least one dome portion.

* * * * *

UNITED STATES PATENT AND TRADEMARK OFFICE
CERTIFICATE OF CORRECTION

PATENT NO. : 6,571,816 B2
DATED : June 3, 2003
INVENTOR(S) : Morishita et al.

It is certified that error appears in the above-identified patent and that said Letters Patent is hereby corrected as shown below:

Column 1,
Line 32, change "No. 11-250885" to -- No. 10-106524 --

Column 12,
Line 20, change "said some portion" to -- said dome portion --

Signed and Sealed this

Fourth Day of May, 2004

JON W. DUDAS
*Acting Director of the United States Patent and Trademark Office*